(12) United States Patent
Miyashita et al.

(10) Patent No.: US 9,766,942 B2
(45) Date of Patent: Sep. 19, 2017

(54) CONTROL DEVICE, PROCESSING DEVICE, AND INFORMATION PROCESSING METHOD

(71) Applicant: SONY CORPORATION, Tokyo (JP)

(72) Inventors: Ken Miyashita, Tokyo (JP); Hironori Isobe, Chiba (JP)

(73) Assignee: SONY CORPORATION, Tokyo (JP)

( * ) Notice: Subject to any disclaimer, the term of this patent is extended or adjusted under 35 U.S.C. 154(b) by 178 days.

(21) Appl. No.: 14/509,384

(22) Filed: Oct. 8, 2014

(65) Prior Publication Data

US 2015/0128148 A1    May 7, 2015

(30) Foreign Application Priority Data

Nov. 1, 2013 (JP) .................. 2013-228340

(51) Int. Cl.
 *G06F 9/50* (2006.01)
 *G06F 9/54* (2006.01)

(52) U.S. Cl.
 CPC .......... *G06F 9/5072* (2013.01); *G06F 9/5038* (2013.01); *G06F 9/5066* (2013.01); *G06F 9/54* (2013.01); *G06F 9/505* (2013.01); *G06F 9/5027* (2013.01); *G06F 9/5044* (2013.01); *G06F 9/5094* (2013.01); *G06F 2209/501* (2013.01); *G06F 2209/509* (2013.01)

(58) Field of Classification Search
 CPC ........ G06F 9/50–9/5072; G06F 9/5094; G06F 9/54–9/548
 See application file for complete search history.

(56) References Cited

U.S. PATENT DOCUMENTS

| | | | | |
|---|---|---|---|---|
| 5,442,789 | A  * | 8/1995  | Baker | G06F 9/5044 712/35 |
| 6,199,093 | B1 * | 3/2001  | Yokoya | G06F 8/451 718/100 |
| 8,473,960 | B2 * | 6/2013  | Chambliss | G06F 9/5083 705/400 |
| 8,706,798 | B1 * | 4/2014  | Suchter | G06F 9/5038 709/202 |
| 8,959,370 | B2 * | 2/2015  | Zomaya | 713/300 |
| 9,086,927 | B2 * | 7/2015  | Jullien | G06F 9/5066 |
| 9,189,290 | B2 * | 11/2015 | Roy | G06F 9/5066 |
| 9,229,779 | B2 * | 1/2016  | Kurabayashi | G06F 9/5066 |

(Continued)

FOREIGN PATENT DOCUMENTS

| | | |
|---|---|---|
| JP | H01-283663 A | 11/1989 |
| JP | 2008-146503 A | 6/2008 |
| JP | 2010-244470 A | 10/2010 |

OTHER PUBLICATIONS

Montcalm, M., et al., ITS: An ILP-Based Combined Instruction/Task Static Scheduling Algorithm, Technical report No. TR-2010-2, Jan. 2010, 5 pages, [retrieved on Jul. 27, 2016], Retrieved from the Internet: <URL: https://www.ruor.uottawa.ca/bitstream/10393/12897/3/Shapiro_Daniel_2010_ITS_an_ILP-based_combined_instruction-task.pdf>.*

(Continued)

*Primary Examiner* — Geoffrey ST Leger
(74) *Attorney, Agent, or Firm* — Chip Law Group

(57) ABSTRACT

There is provided a control device including an allocation unit configured to allocate processing of tasks to any of respective processing devices on the basis of contents of the tasks and at least any of attributes and states of the processing devices.

10 Claims, 8 Drawing Sheets

(56) References Cited

U.S. PATENT DOCUMENTS

| | | | | |
|---|---|---|---|---|
| 2005/0027949 A1* | 2/2005 | Iwamori | ............... | G06F 9/5027 711/150 |
| 2008/0288957 A1* | 11/2008 | Cascaval | ............... | G06F 9/5038 719/313 |
| 2011/0161974 A1* | 6/2011 | Kurabayashi | ......... | G06F 9/5066 718/104 |
| 2011/0239017 A1* | 9/2011 | Zomaya | ................ | G06F 1/3203 713/320 |
| 2012/0079492 A1* | 3/2012 | Chambliss | ............ | G06F 9/5083 718/104 |
| 2013/0006955 A1* | 1/2013 | Jullien | .................. | G06F 9/5066 707/706 |
| 2013/0198755 A1* | 8/2013 | Kim | ........................ | G06F 9/505 718/104 |
| 2013/0311628 A1* | 11/2013 | Kruglick | ................... | G06F 8/61 709/223 |
| 2014/0143777 A1* | 5/2014 | Guo | .................... | H04L 43/0817 718/1 |
| 2014/0149993 A1* | 5/2014 | Sandstrom | ................ | G06F 9/54 718/108 |

OTHER PUBLICATIONS

Lo, V. M., Heuristic algorithms for task assignment in distributed systems, IEEE Transactions on Computers, vol. 37, Issue: 11, Nov. 1988, pp. 1384-1397, [retrieved on Jul. 26, 2016], Retrieved from the Internet: <URL:http://ieeexplore.ieee.org/>.*

Khuat, Q-H., et al., Communication cost reduction for hardware tasks placed on homogeneous reconfigurable resource, Design and Architectures for Signal and Image Processing (DASIP), 2013, 6 pages, [retrieved on May 11, 2017], Retrieved from the Internet: <URL:http://ieeexplore.ieee.org/>.*

Sharma, R., et al., Duplication with task assignment in mesh distributed system, World Congress on Information and Communication Technologies (WICT), 2011, pp. 672-676, [retrieved on May 11, 2017], Retrieved from the Internet: <URL:http://ieeexplore.ieee.org/>.*

\* cited by examiner

CONTROL DEVICE, PROCESSING DEVICE, AND INFORMATION PROCESSING METHOD

CROSS REFERENCE TO RELATED APPLICATIONS

This application claims the benefit of Japanese Priority Patent Application JP 2013-228340 filed Nov. 1, 2013, the entire contents of which are incorporated herein by reference.

BACKGROUND

The present disclosure relates to a control device, a processing device, and an information processing method.

Recently, with enlargement of tasks to be processed by an information processing device, distributed processing and parallel processing have been performed more by cores or information processing devices. In addition, diverse technologies have been developed in order to enhance processing efficiency of the distributed processing and the parallel processing.

For example, JP H01-283663A discloses a technology of equalizing central processing unit (CPU) load in a multi-CPU environment, by supervising the load of the CPU and allocating a task.

In addition, JP 2008-146503A discloses a technology to time-share processing ability of sub-processing units (SPUs) of a cell chip and to allocate a task.

JP H01-283663A and JP 2008-146503A are technologies to allocate a task in a single device. In addition, a technology relating to allocation of processing between computational nodes has been developed. For example, JP 2010-244470A discloses a technology to check how an amount of data changes depending on a way to share the processing in a distributed processing system, and to change degree of the distributed processing.

SUMMARY

However, in the technologies disclosed in JP H01-283663A, JP 2008-146503A and JP 2010-244470A, devices to process tasks are homogeneous. A heterogeneous environment in which properties of devices differ greatly has not been assumed. Accordingly, the present disclosure proposes a novel and improved control device, processing device and information processing method capable of allocating tasks to enhance processing efficiency in the heterogeneous environment.

According to an embodiment of the present disclosure, there is provided a control device including an allocation unit configured to allocate processing of tasks to any of respective processing devices on the basis of contents of the tasks and at least any of attributes and states of the processing devices.

According to another embodiment of the present disclosure, there is provided a processing device including a communication unit configured to transmit, to a control device, information indicating at least any of an attribute or a state of the processing device, and configured to receive a task allocated by the control device, and a processing unit configured to process the task received by the communication unit.

According to another embodiment of the present disclosure, there is provided an information processing method executed by a processor of an information processing device, the method including allocating processing of tasks to any of respective processing devices on the basis of contents of the tasks and at least any of attributes and states of the processing devices.

As described above, according to the embodiments of the present disclosure, it is possible to allocate tasks to enhance processing efficiency in the heterogeneous environment. Note that the present disclosure is not limited to the effect stated above and in addition to or in place of the effect stated above, may achieve any of the effects indicated in this specification or effects that can be understood from the specification.

DETAILED DESCRIPTION OF THE EMBODIMENT(S)

Figure 1:
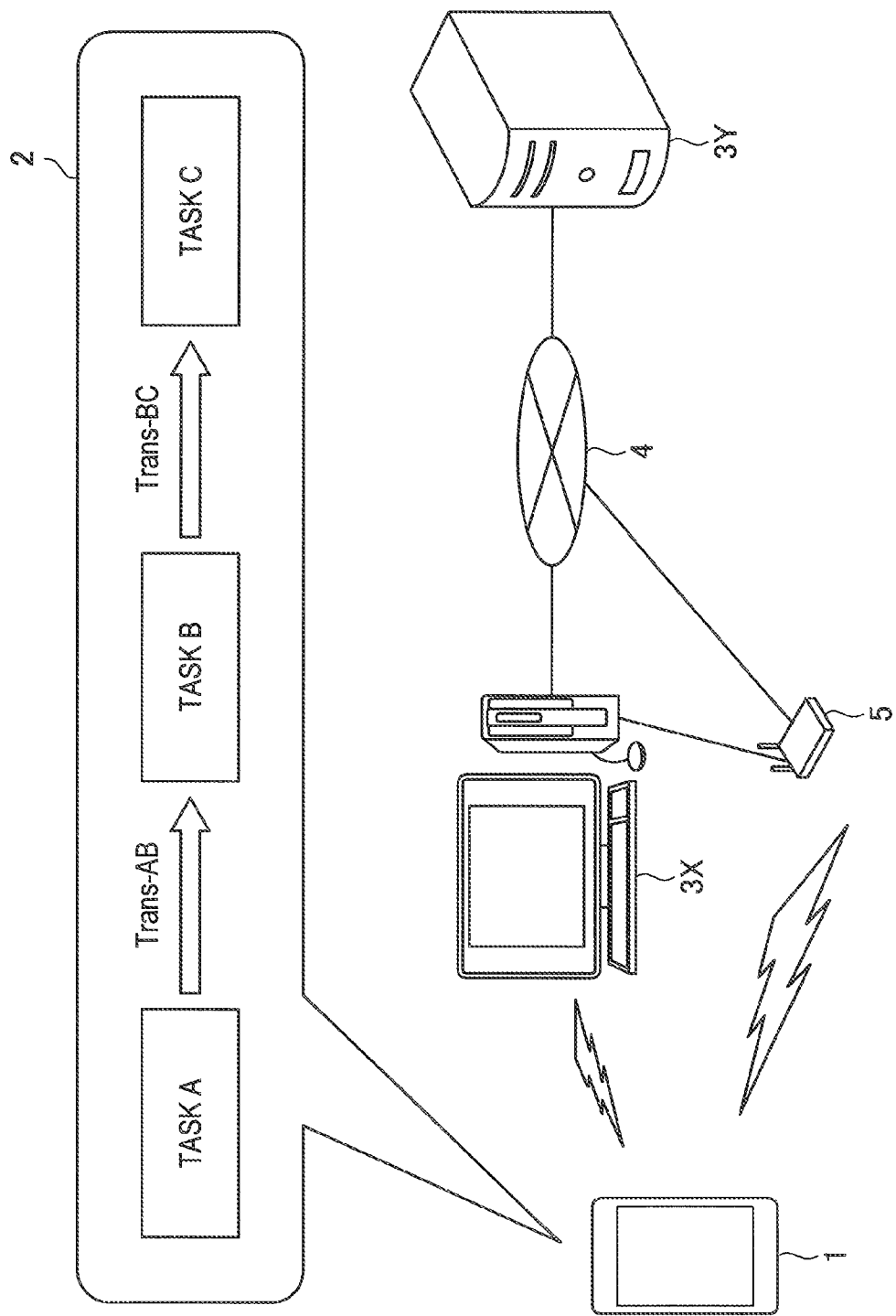
FIG. 1 is a diagram showing an overview of an information processing system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description is given in the following order.
1. Overview of Information Processing System according to Embodiment of Present Disclosure
2. Embodiments
2-1. First Embodiment
2-1-1. Configuration
2-1-2. Operation Processing
2-2. Second Embodiment
2-2-1. Configuration
2-2-2. Operation Processing
2-3. Third Embodiment
2-3-1. Overview
2-3-2. Operation Processing
3. Conclusion

1. OVERVIEW OF INFORMATION PROCESSING SYSTEM ACCORDING TO EMBODIMENT OF PRESENT DISCLOSURE

Recently, with progress of cloud technologies and with popularization of smartphones, mobile devices, and home networks, it has been assumed to perform distributed processing and parallel processing in heterogeneous environments. An information processing system according to the present embodiment allocates tasks to enhance processing efficiency in such heterogeneous environment.

The information processing system according to the present embodiment includes a control device and a plurality of processing devices. On the basis of contents of respective tasks to be processed and properties of respective processing devices, the control device allocates each of the tasks to each of the processing devices. Subsequently, each of the processing devices processes each of the tasks allocated by the control devices.

Specifically, the control device divides a series of data processing which are described in a manner independent from configurations of the processing devices in view of a property and communication cost for each processing device available at that time, allocates the divided data processing to each piece of equipment, and performs distributed processing by combining the processing devices. More specifically, by user input or back-end server control, the control device first describes procedure for processing data as an abstract data pipeline (plan of processing a processing element for pipeline processing) in a manner independent from configurations of the processing devices. Note that, the pipeline processing is a technology to connect processing elements in series (one-to-one, one-to-many, many-to-one, or many-to-many) and to concurrently perform the processing in a manner that the output of one element is the input of the next element. Hereinafter, each data processing to form such data pipeline is also referred to as a task. Next, the control device finds usable processing devices, and acquires property information including an attribute (for example, information indicating that the device has a GPU, a DSP and the like, and the device can perform high-speed processing on certain calculation) or a state (for example, information indicating that the device is in an overload state) of each of the processing devices. Subsequently, the control device comprehensively evaluates, by an evaluation function, execution cost of a task based on the property information for each of the processing devices, and communication cost between the tasks. Next, the control device decides allocation of the tasks on the basis of the evaluation result from the evaluation function. By comprehensively evaluating not only the execution cost of each of the tasks but also communication cost between the tasks, the control device can enhance performance in the whole series of data processing.

JP H01-283663A, JP 2008-146503A, or JP 2010-244470A have not been considered that data processing is described as a pipeline or have not been considered cost for data transfer between adjacent tasks in the pipeline. On the other hand, the control device according to the present embodiment can effectively execute a series of data processing using the plurality of processing devices by describing the data processing as the pipeline and considering the transfer cost. Moreover, in JP 2010-244470A, allocation is performed with reference to change of an amount of data that is acquired only after data processing. However, the control device according to the present embodiment decides allocation of processing on the basis of information that is understood beforehand, in a stage before the distributed processing is started. In addition, the control device according to the present embodiment can find processing allocation to minimize power consumption, processing time, or the like in the whole system by adjusting a parameter of the evaluation function.

The control device can also reduce communication traffic between the tasks by adjusting a content of communication between the tasks connected through the pipeline. Specifically, the control device reduces an amount of data to be transmitted from a task in a former stage to a task in a latter stage, by adjusting a content of the data to be transferred from the task in the former stage in accordance with a content (precision, frequency, or the like) of data necessary for the task in the latter stage which is connected through the pipeline. By reducing the communication traffic between the tasks, the control device can enhance performance more in the whole series of data processing.

Hereinafter, with reference to FIG. 1, an overview of an information processing system according to an embodiment of the present disclosure is explained.

FIG. 1 is a diagram showing an overview of an information processing system according to an embodiment of the present disclosure. A shown in FIG. 1, a control device 1 is a smartphone, a processing device 3X is a personal computer (PC), and a processing device 3Y is a server. The control device 1 can perform wireless communication with the processing device 3X, and also can perform communication indirectly through an access point 5. Alternatively, the control device 1 can communicate with the processing device 3Y through the access point 5 and a network 4. In addition, the processing device 3X and the processing device 3Y can connect with each other through the network 4. The control device 1 preliminarily or dynamically acquires property information indicating attributes or states of the processing devices 3X and 3Y, and allocates tasks on the basis of the acquired information. Hereinafter, the processing devices 3X and 3Y are referred to as processing devices 3 in a case where it is not necessary to particularly distinguish the processing devices 3X and 3Y.

Here, it is assumed that the control device 1 causes the processing devices 3 to execute three tasks with a reference numerical 2, which has been input by a user who operates the control device 1. AS shown in FIG. 1, the tasks with the reference numerical 2 form a pipeline in which processing sequence is decided in an order of a task A, a task B, and a task C. Trans-AB shown in FIG. 1 indicates task-to-task communication between the task A and the task B, and Trans-BC indicates task-to-task communication between the task B and the task C.

As an example, it is assumed that the processing device 3X is suitable for processing of the task A and the processing device 3Y is suitable for processing of the task B and the task C. In a case where an amount of data transfer in Trans-AB is little, the control device 1 allocates the task A to the processing device 3X, and allocates the task B and the task C to the processing device 3Y. On the other hand, in a case where the amount of data transfer in Trans-AB is great, the control device 1 allocates the task A and the task B to the processing device 3X, and allocates the task C to the processing device 3Y so as to avoid a great amount of data communication through the network 4. As described above, the control device 1 can enhance performance in the whole series of data processing on the basis of a communication environment and property information indicating attributes or states of the processing devices 3X and 3Y.

Note that, in FIG. 1, the control device 1 is the smartphone. However, the present technology is not limited thereto. For example, the control device 1 may be a head mounted display (HMD), a digital camera, a digital video camera, a personal digital assistant (PDA), a PC, a laptop, a tablet, a mobile phone, a portable music player device, a portable video processing device, or a portable game device.

For another example, the control device 1 may be a television receiver, a music player device, a video recording and player device, another operation terminal, or another device that receives operation from a person. Alternatively, it is also possible that a server on a cloud has a function as the control device 1, and a smartphone or the like functions as an input/output device for the server. Alternatively, it is also possible that a smartphone or the like functions as the control device 1, and a watch-type terminal, the HMD or the like functions as an input/output device for the smartphone. In a similar way, the processing device 3X and the processing device 3Y are not limited to the PC and the server, and they may be the HMD, the television receiver, and the like.

As described above, the overview of the information processing system according to the embodiment of the present disclosure has been explained. Next, each embodiment is explained in detail.

2. EMBODIMENTS

2-1. First Embodiment

Figure 2:
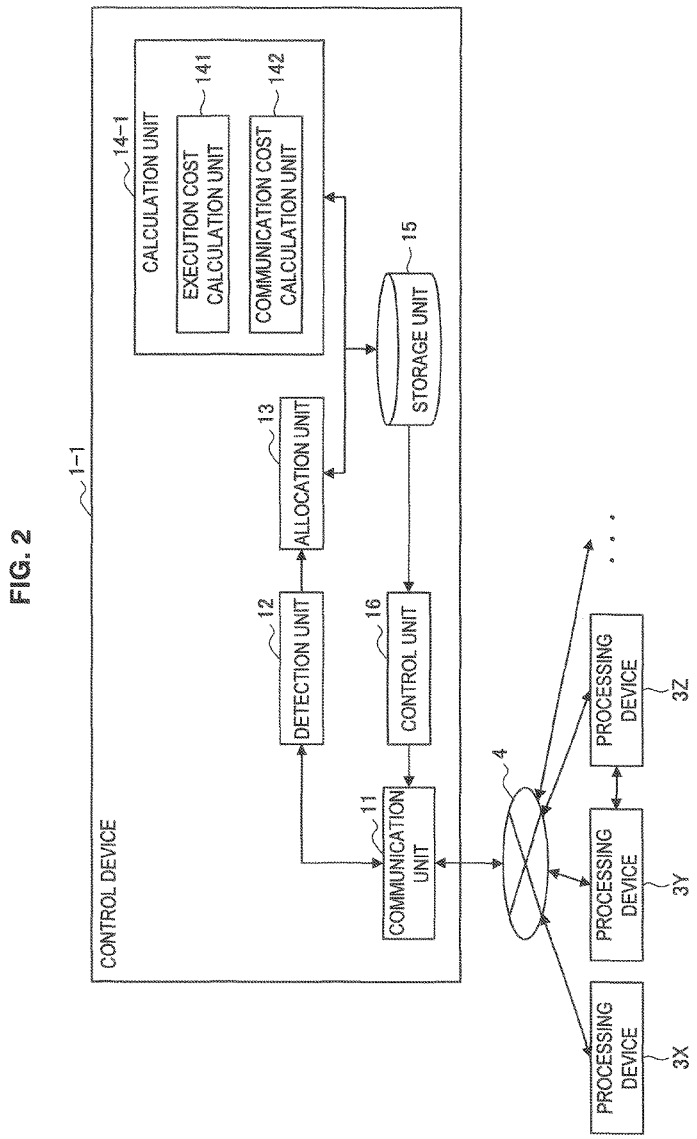
FIG. 2 is a block diagram showing a configuration of a control device according to a first embodiment.

First, with reference to FIG. 2, a configuration of a control device 1-1 according to a first embodiment is explained.

2-1-1. Configuration

FIG. 2 is a block diagram showing a configuration of a control device 1-1 according to the first embodiment. As shown in FIG. 2, the control device 1-1 includes a communication unit 11, a detection unit 12, an allocation unit 13, a calculation unit 14-1, a storage unit 15, and a control unit 16. The control device 1-1 connects with processing devices 3X, 3Y, 3Z through the network 4. Hereinafter, the processing devices 3X, 3Y, and 3Z are referred to as processing devices 3 in a case where it is not necessary to particularly distinguish the processing devices 3X, 3Y, and 3Z.

(Communication Unit 11)

The communication unit 11 is a communication module to transmit/receive data between the processing devices 3 in a wired/wireless manner. The communication unit 11 communicates directly with the processing devices 3 or communicates indirectly with the processing devices 3 through the network 4 or the access point 5 which is not shown in FIG. 2, by means of a wireless local area network (LAN), Wireless Fidelity (Wi-Fi) (registered trademark), infrared communication, Bluetooth (registered trademark), or a wired LAN, for example.

(Detection Unit 12)

The detection unit 12 has a function of detecting the processing devices 3 from communication with an outside performed by the communication unit 11. For example, the processing devices 3 detected by the detection unit 12 may be an equipment group on a LAN capable of high-speed communication with the control device 1-1 which a user operates in hand. A specific example of the equipment group includes a home server, a PC, and the like that are connected with a same home network in a case where the user operates equipment connected with the home network. Alternatively, in a case where the user operates equipment in a mobile environment, specific example of the equipment group includes a smartphone, a mobile router, a wearable camera, and the like that are connected with a personal area network (PAN) that are formed by the equipment group owned by the user personally. Alternatively, the processing devices 3 detected by the detection unit 12 may be an equipment group in a house to which the user can access from outside the house in a case where the user is in the outside the house, an equipment group to which the user has a right of access from among the equipment owned by another person, a server on a cloud, or the like.

The detection unit 12 acquires, through the communication unit 11 from the detected processing devices 3, property information including an attribute (for example, information indicating that a device has a GPU, a DSP and the like, and the device can perform high-speed processing on certain calculation) or a state (for example, information indicating that the device is in an overload state) of each of the processing devices. The detection unit 12 outputs the detected processing devices 3 and the acquired property information to the allocation unit 13.

(Allocation Unit 13)

The allocation unit 13 has a function of allocating processing of tasks to any of respective processing devices 3 on the basis of at least any of contents of the tasks and attributes or states of the processing devices 3. Here, the processing devices 3 to which the allocation unit 13 allocates the tasks are the processing devices 3 detected by the detection unit 12.

Allocation of the tasks performed by the allocation unit 13 is explained in detail. By user input or back-end server control, the allocation unit 13 first describes a series of data processing to be processed as tasks that forms a pipeline. Next, the allocation unit 13 finds all combinations (candidates for allocation) of allocation indicating combinations of tasks and processing devices which process the tasks, and stores information indicating the combinations in the later-described storage unit 15. Subsequently, the allocation unit 13 selects any one from the candidates for allocation on the basis of evaluation values calculated by the later described calculation unit 14-1, and decides allocation of the processing devices 3 to respective tasks.

(Calculation Unit 14-1)

The calculation unit 14-1 has a function of calculating, on the basis of combinations of the tasks and the processing devices which process the tasks, evaluation values for respective candidates for allocation found by the allocation unit 13. As shown in FIG. 2, the calculation unit 14-1 functions as an execution cost calculation unit 141 and a communication cost calculation unit 142. The calculation unit 14-1 calculates the evaluation values on the basis of execution cost calculated by the execution cost calculation unit 141 and communication cost calculated by the communication cost calculation unit 142.

Execution Cost Calculation Unit 141

The execution cost calculation unit 141 has a function of calculating the evaluation cost on the basis of the sum of a product of standard cost (first standard cost) based on the contents of the tasks and a cost coefficient (first cost coefficient) based on at least any of attributes or states of the processing devices 3 which process the tasks. More specifically, the execution cost calculation unit 141 first calculates a product of the standard cost and the cost coefficient with respect to each of the combinations of the tasks and the processing devices 3 which process the tasks, the combination being included by the candidates for allocation of execution-cost calculation targets. Subsequently, the execution cost calculation unit 141 calculates the execution cost of the candidates for allocation by summing up the calculated products with respect to the candidates for allocation.

The standard cost based on a content of a task is cost in a case where standard equipment processes the task. The cost coefficient is a value indicating how many times of cost is necessary when the specific processing devices 3 perform the task in comparison with the standard equipment. Here, the cost means an index indicating power consumption, processing time, a processing load or the like. The standard cost and the cost coefficient vary depending on which index to be adopted. The execution cost calculation unit 141 calculates the standard cost and decides the cost coefficient on the basis of the adopted index. Diverse indexes may be adopted as the cost in accordance with user instructions. However, in the present specification, an index indicating power consumption is adopted. Hereinafter, Table 1 presents an example of elements to decide cost coefficients. As shown in Table 1, the cost coefficients vary depending on attributes such as reading and writing speed of hardware or a storage and states such as a remaining battery or a temperature.

TABLE 1

| Element | Effects on cost coefficient |
|---|---|
| Hardware for calculation such as GPU or DSP | A cost coefficient is low in a case where a content of a task can be processed in high speed by the special hardware such as GPU or DSP. |
| Sensor hardware such as camera, depth sensor, acceleration sensor, geomagnetic sensor, gyro sensor, GPS receiver, eye gaze sensor, or pressure sensor | A cost coefficient becomes low as sensor precision becomes high. In a case of trying to allocate a task for which a certain sensor is necessary to equipment in which the sensor is not built, the allocation of the task to the equipment is virtually disabled by setting a cost coefficient to infinity. |
| Remaining battery | With respect to equipment having a low remaining battery, a cost coefficient is high. |
| Load of CPU, GPU, or the like | With respect to equipment currently having high load, a cost coefficient is high. |
| Remaining memory | With respect to equipment having low remaining memory, a cost coefficient is high. |
| Remaining storage | With respect to equipment having low remaining storage, a cost coefficient for a task to write in the storage is high. |
| Reading and writing speed of storage | With respect to equipment having storage with low reading-and-writing speed, a cost coefficient is high. |
| Current temperature of heat from equipment | With respect to equipment having high temperature, a cost coefficient is high. |

Communication Cost Calculation Unit 142

The communication cost calculation unit 142 has a function of calculating the communication cost on the basis of processing sequence of the tasks indicated in the pipeline and a communication environment between the tasks. Specifically, the communication cost calculation unit 142 calculates the communication cost on the basis of the sum of a product of standard cost (second standard cost) based on the communication traffic between the tasks and a cost coefficient (second cost coefficient) based on an communication environment between the tasks. More specifically, the communication cost calculation unit 142 first calculates a product of the standard cost and the cost coefficient with respect to each of the combinations of former-stage tasks and the latter-stage tasks which are indicated by the processing sequence of the tasks. Here, the cost coefficient is decided depending on communication environments of processing devices 3 which process the former-stage tasks and processing devices 3 which process the latter-stage tasks, the communication environment being indicated by the candidates for allocation of communication-cost calculation targets. Subsequently, the communication cost calculation unit 142 calculates the communication cost of the candidates for allocation by summing up the calculated products with respect to the candidates for allocation.

The standard cost based on communication traffic between the tasks means communication cost at a time of transferring data for which transfer between a former-stage task and a latter-stage task is necessary through a standard communication technology. The cost coefficient is a value indicating how many times of cost is necessary when communication is performed within the specific processing devices 3 or between a processing device 3 and another processing device 3, in comparison with the standard communication technology. Here, in a way similar to the case of the execution cost, the cost means an index indicating power consumption, processing time, a processing load or the like. The standard cost and the cost coefficient vary depending on which index to be adopted. The communication cost calculation unit 142 calculates the standard cost and decides the cost coefficient on the basis of the adopted index. Diverse indexes may be adopted as the cost in accordance with user instructions. However, in the present specification, an index indicating power consumption is adopted. Hereinafter, Table 2 presents an example of elements to decide cost coefficients. In any case, a cost coefficient becomes high as communication speed is low or as latency is high.

TABLE 2

| Element |
|---|
| Access speed of memory |
| Speed of data bus between multichips |
| Speed in wired or wireless communication |
| Latency in wired or wireless communication |

The calculation unit 14-1 calculates the evaluation values on the basis of execution cost calculated by the execution cost calculation unit 141 and communication cost calculated by the communication cost calculation unit 142. The calculation unit 14-1 can calculate the evaluation values by summing, weighted summing, or multiplying the execution cost and the communication cost. As an example, in the present specification, the calculation unit 14-1 calculates the evaluation values by summing the execution cost and the communication cost. The calculation unit 14-1 stores the calculated evaluation values in the storage unit 15.

(Storage Unit 15)

The storage unit 15 is a portion which performs recording and reproduction of data in a certain recording medium. For example, the storage unit 15 is implemented as a hard disc drive (HDD). As the recording medium, various kinds of media may be used, including solid-state memories such as flash memories, memory cards incorporating solid-state memories, optical discs, magneto-optical discs, and hologram memories. The recording medium may have a configuration which can execute recording and reproduction in accordance with the recording medium adopted as the storage unit 15.

The storage unit 15 according to the present embodiment stores candidates for allocation that has been found by the allocation unit 13 and candidates for allocation that has been selected by the allocation unit 13. The storage unit 15 stores the evaluation values calculated by the calculation unit 14-1.

(Control Unit 16)

The control unit 16 functions as an arithmetic device and a control device to control all of the operating processes in the control device 1-1 in accordance with various kinds of programs. For example, the control unit 16 is implemented by a CPU and microprocessors. The control unit 16 may include a read only memory (ROM) for storing programs and arithmetic parameters to be used, and a random access memory (RAM) for temporarily storing parameters and the like that arbitrarily change.

The control unit 16 according to the present embodiment has a function of performing control in a manner that the processing devices 3 process the tasks on the basis of the allocation performed by the allocation unit 13. Specifically, the storage unit 16 first refers to the allocation that is decided by the allocation unit 13 and stored in the storage unit 15. Subsequently, the control unit 16 controls the processing devices 3 through the communication unit 11 in a manner that the tasks is processed by respective processing devices 3 in order of processing sequence indicated in the pipeline, the processing devices 3 being allocated by the allocation unit 13 on the basis of the referred allocation.

(Network 4)

The network 4 is a wired or wireless communication channel through which information is transmitted from devices connected with the network 4. For example, the network 4 is implemented by a home network or the Internet.

(Processing Device 3)

The processing device 3 is an information processing device including a communication unit to communicate with the control device 1-1, and a processing unit to process a task allocated by the control device 1-1 on the basis of communication with the control device 1-1 performed by the communication unit. The processing device 3 transmits property information indicating at least any of its attribute and state to the control device 1-1, and receives and processes a task allocated by the control device 1-1. More specifically, the communication unit of the processing device 3 first transmits its property information to the control device 1-1. Subsequently, the processing unit of the processing device 3 processes the task allocated by the control device 1-1, on the basis of information input from the control device 1-1 or another processing device 3 which has processed a task in a former stage. Subsequently, the communication unit of the processing device 3 outputs the information, which has been output from the processing unit, to the control device 1-1 or another processing device 3 which processes a task in a latter stage. For example, the processing device 3 is implemented by a server on a cloud, a smartphone, an HMD, a digital camera, a digital video camera, a PDA, a PC, a laptop, a tablet, a mobile phone, a portable music player device, a portable video processing device, a portable game device, a television receiver, a music player device, a video recording and player device, or another operation terminal.

The configuration of the control device 1-1 according to the present embodiment has been explained. Next, with reference to FIG. 3, operation of the control device 1-1 is explained.

2-1-2. Operation Processing

Figure 3:
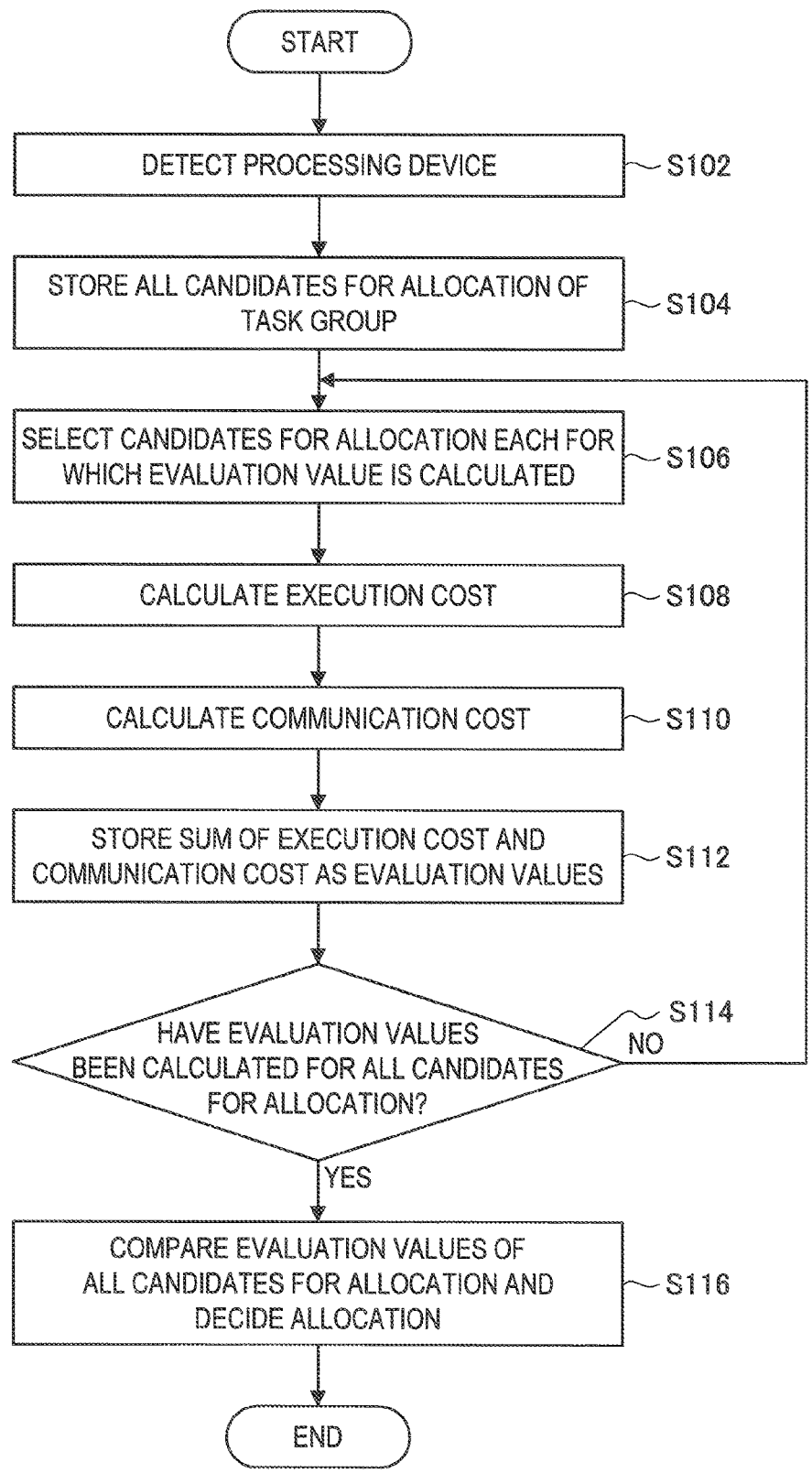
FIG. 3 is a flowchart showing operation of the control device according to the first embodiment.

FIG. 3 is a flowchart showing operation of the control device 1-1 according to the first embodiment.

First, in Step S102, the control device 1-1 detects the processing devices 3. Specifically, the detection unit 12 detects the processing devices 3 capable of processing tasks, from communication with an outside performed by the communication unit 11. At this time, the detection unit 12 acquires property information including an attribute or a state for each of the processing devices, from the detected processing devices 3. For example, in the example shown in FIG. 1, the detection unit 12 detects the processing device 3X and the processing device 3Y as the processing devices 3 capable of processing the task A, the task B, and the task C.

Next, in Step S104, the control device 1-1 stores all candidates for allocation of a task group. Specifically, the allocation unit 13 finds combinations (candidates for allocation) of the tasks and processing devices which process the tasks, and stores information indicating the combinations in the storage unit 15. For example, in the example shown in FIG. 1, the allocation unit 13 stores, in the storage unit 15, eight candidates for allocation shown in the following Table 3.

TABLE 3

|  | Task A | Task B | Task C |
| --- | --- | --- | --- |
| Allocation | Processing device 3X | Processing device 3X | Processing device 3X |
| Allocation | Processing device 3Y | Processing device 3X | Processing device 3X |
| Allocation | Processing device 3X | Processing device 3Y | Processing device 3X |
| Allocation | Processing device 3Y | Processing device 3Y | Processing device 3X |
| Allocation | Processing device 3X | Processing device 3X | Processing device 3Y |
| Allocation | Processing device 3Y | Processing device 3X | Processing device 3Y |
| Allocation | Processing device 3X | Processing device 3Y | Processing device 3Y |
| Allocation | Processing device 3Y | Processing device 3Y | Processing device 3Y |

Next, in Step S106, the control device 1-1 selects candidates for allocation each for which an evaluation value is calculated. Specifically, the calculation unit 14-1 selects candidates for allocation to be evaluation-value calculation targets, from among the candidates for allocation found by the allocation unit 13. After that, in Steps S108 to S112, the calculation unit 14-1 calculates an evaluation value for each of the selected candidates for allocation.

Next, in Step S108, the control device 1-1 calculates execution cost. More specifically, the execution cost calculation unit 141 calculates the execution cost on the basis of contents of the tasks and at least any of attributes or states of the processing devices 3 which process the tasks. Hereinafter, processing in Step S108 is explained in detail.

First, the execution cost calculation unit 141 calculates the standard cost (cost in a case of execution by the standard equipment) of respective tasks. In the example shown in FIG. 1, the execution cost calculation unit 141 calculates standard cost shown in the following Table 4. Note that, cost for power consumption or the like becomes larger as values in Table 4 are larger.

TABLE 4

|  | Task A | Task B | Task C |
| --- | --- | --- | --- |
| Cost in a case of execution by the standard equipment | 3 | 2 | 5 |

Next, the execution cost calculation unit 141 decides cost coefficients. In the example shown in FIG. 1, the execution cost calculation unit 141 decides cost coefficients shown in the following Table 5. As shown in Table 5, for example, in a case where the task B includes much calculation with high concurrency, the processing device 3X which does not have the GPU performs low-speed calculation (cost coefficient is 10), and the processing device 3Y which has the GPU performs high-speed calculation (cost coefficient is 2). As described above, the cost coefficients are decided depending on properties of the tasks and properties of the equipment.

TABLE 5

|  | Task A | Task B | Task C |
|---|---|---|---|
| Cost coefficient in a case of execution by the processing device 3X | 1 | 10 | 1 |
| Cost coefficient in a case of execution by the processing device 3Y | 5 | 2 | 6 |

Next, the execution cost calculation unit 141 calculates a product of the standard cost and the cost coefficient with respect to each of the combinations of the tasks and the processing devices 3 which process the tasks, the combination being included by the candidates for allocation. With regard to the example shown in FIG. 1, the execution cost calculation unit 141 calculates a product of the standard cost in Table 4 and the cost coefficient in Table 5, as shown in the following Table 6.

TABLE 6

|  | Task A | Task B | Task C |
|---|---|---|---|
| Cost in a case of execution by the processing device 3X | 3 = 3 × 1 | 20 = 2 × 10 | 5 = 5 × 1 |
| Cost in a case of execution by the processing device 3Y | 15 = 3 × 5 | 4 = 2 × 2 | 30 = 5 × 6 |

Subsequently, the execution cost calculation unit 141 calculates the execution costs of the candidates for allocation by summing up the calculated products with respect to the candidates for allocation. For example, in the example shown in FIG. 1, the execution cost of the allocation in Table 3 is shown in the following Table 7, and the sum of them is 12.

TABLE 7

|  | Task A | Task B | Task C |
|---|---|---|---|
| Execution cost in a case of the allocation | 3 | 4 | 5 |

The processing in Step S108 has been explained in detail.

Next, in Step S110, the control device 1-1 calculates communication cost. Specifically, the communication cost calculation unit 142 calculates the communication cost on the basis of processing sequence of the tasks indicated in the pipeline and a communication environment between the tasks. Hereinafter, processing in Step S110 is explained in detail.

First, the communication cost calculation unit 142 calculates the standard cost (communication cost using the standard communication technology) based on communication traffic between the tasks. In the example shown in FIG. 1, the communication cost calculation unit 142 calculates standard cost shown in the following Table 8. Note that, cost for power consumption or the like becomes larger as values in Table 8 are larger.

TABLE 8

|  | Trans-AB | Trans-BC |
|---|---|---|
| Communication cost using standard communication technology | 2 | 2 |

Next, the communication cost calculation unit 142 decides cost coefficients. In the example shown in FIG. 1, the communication cost calculation unit 142 decides cost coefficients shown in the following Table 9. As shown in Table 9, communication between two processes between the processing device 3X and the processing device 3Y costs three times more than communication between two processes performed by the processing device 3X or on one of CPUs within the processing device 3Y. As described above, the cost coefficients are decided depending on communication environments between the tasks.

TABLE 9

|  | Communication cost coefficient between tasks |
|---|---|
| Between two tasks within processing device 3X | 1 |
| Between two tasks within processing device 3Y | 1 |
| Between task in processing device 3X and task in processing device 3Y | 3 |

Next, the communication cost calculation unit 142 calculates a product of the standard cost and the cost coefficient with respect to each of the combinations of former-stage tasks and the latter-stage tasks which are indicated by the processing sequence of the tasks. With regard to the example shown in FIG. 1, the communication cost calculation unit 142 calculates a product of the standard cost in Table 8 and the cost coefficient in Table 9, as shown in the following Table 10.

TABLE 10

|  | Trans-AB | Trans-BC |
|---|---|---|
| Between two tasks within processing device 3X | 2 = 2 × 1 | 2 = 2 × 1 |
| Between two tasks within processing device 3Y | 2 = 2 × 1 | 2 = 2 × 1 |
| Between task in processing device 3X and task in processing device 3Y | 6 = 2 × 3 | 6 = 2 × 3 |

Subsequently, the communication cost calculation unit 142 calculates the communication cost of the candidates for allocation by summing up the calculated products with respect to the candidates for allocation. For example, in the example shown in FIG. 1, the communication cost of the allocation in Table 3 is shown in the following Table 11, and the sum of them is 12.

TABLE 11

|  | Trans-AB | Trans-BC |
|---|---|---|
| Communication cost in a case of the allocation | 6 = 2 × 3 | 6 = 2 × 3 |

The processing in Step S110 has been explained in detail.

Next, in Step S112, the control device 1-1 stores the sum of the execution cost and the communication cost as the evaluation values. More specifically, the calculation unit 14-1 stores, in the storage unit 15, the sum of the execution cost calculated in Step S108 and the communication cost calculated in Step S110 as the evaluation values of candidates for allocation selected in Step S106.

Next, in Step S114, the control device 1-1 determines whether or not the evaluation values have been calculated for all candidates for allocation. For example, in the example shown in FIG. 1, the calculation unit 14-1 determines whether or not the evaluation values have been calculated for all eight candidates for allocation shown in Table 3 and have been stored in the storage unit 15.

In a case where calculation values have not been calculated for all candidates for allocation (NO in Step S114), the processing returns to Step S106.

On the other hand, in a case where the evaluation values have been calculated for all candidates for allocation (YES in S114), the control device 1-1 compares the evaluation values of all candidates for allocation and decides the allocation in Step S116. More specifically, the allocation unit 13 selects a candidate for allocation having a lowest evaluation value (low cost) from among all candidates for allocation. For example, in the example shown in FIG. 1, the storage unit 15 stores the execution cost, the communication cost, and the evaluation values which has been calculated by the calculation unit 14-1 for respective candidates for allocation, as shown in the following Table 12. From among the candidates, the allocation unit 13 selects the allocation which is a candidate for allocation having the lowest evaluation value. As shown in Table 3, data is round-tripped between the processing device 3X and the processing device 3Y in order to process three tasks in the allocation. It may be considered that selecting such candidate for allocation is illogical in view of communication cost. However, as shown in Table 5, such situation happens since a cost coefficient necessary for the processing device 3X to process the task B is great.

TABLE 12

|  | Evaluation value | Task A | Task B | Task C | Trans-AB | Trans-BC |
|---|---|---|---|---|---|---|
| Allocation | 32 | 3 | 20 | 5 | 2 | 2 |
| Allocation | 48 | 15 | 20 | 5 | 6 | 2 |
| Allocation | 24 | 3 | 4 | 5 | 6 | 6 |
| Allocation | 32 | 15 | 4 | 5 | 2 | 6 |
| Allocation | 61 | 3 | 20 | 30 | 2 | 6 |
| Allocation | 77 | 15 | 20 | 30 | 6 | 6 |
| Allocation | 45 | 3 | 4 | 30 | 6 | 2 |
| Allocation | 53 | 15 | 4 | 30 | 2 | 2 |

The operation of the control device 1-1 according to the first embodiment has been explained.

2-2. Second Embodiment

According to the present embodiment, with regard to two consecutive tasks in processing sequence indicated by a pipeline, it is possible to reduce communication cost between tasks and to improve performance of a whole series of data processing, by changing data transferred from a former-stage task depending on a content of a latter-stage task. As described above with reference to Step S110 in FIG. 3, communication cost of a candidate for allocation in the first embodiment is uniformly decided on the basis of Tables 8 to 11. According to the present embodiment, it is possible to reduce the communication cost more by dynamically adjusting a communication content between tasks. Hereinafter, with reference to FIG. 4, a configuration of a control device 1-2 according to the present embodiment is explained.

2-2-1. Configuration

Figure 4:
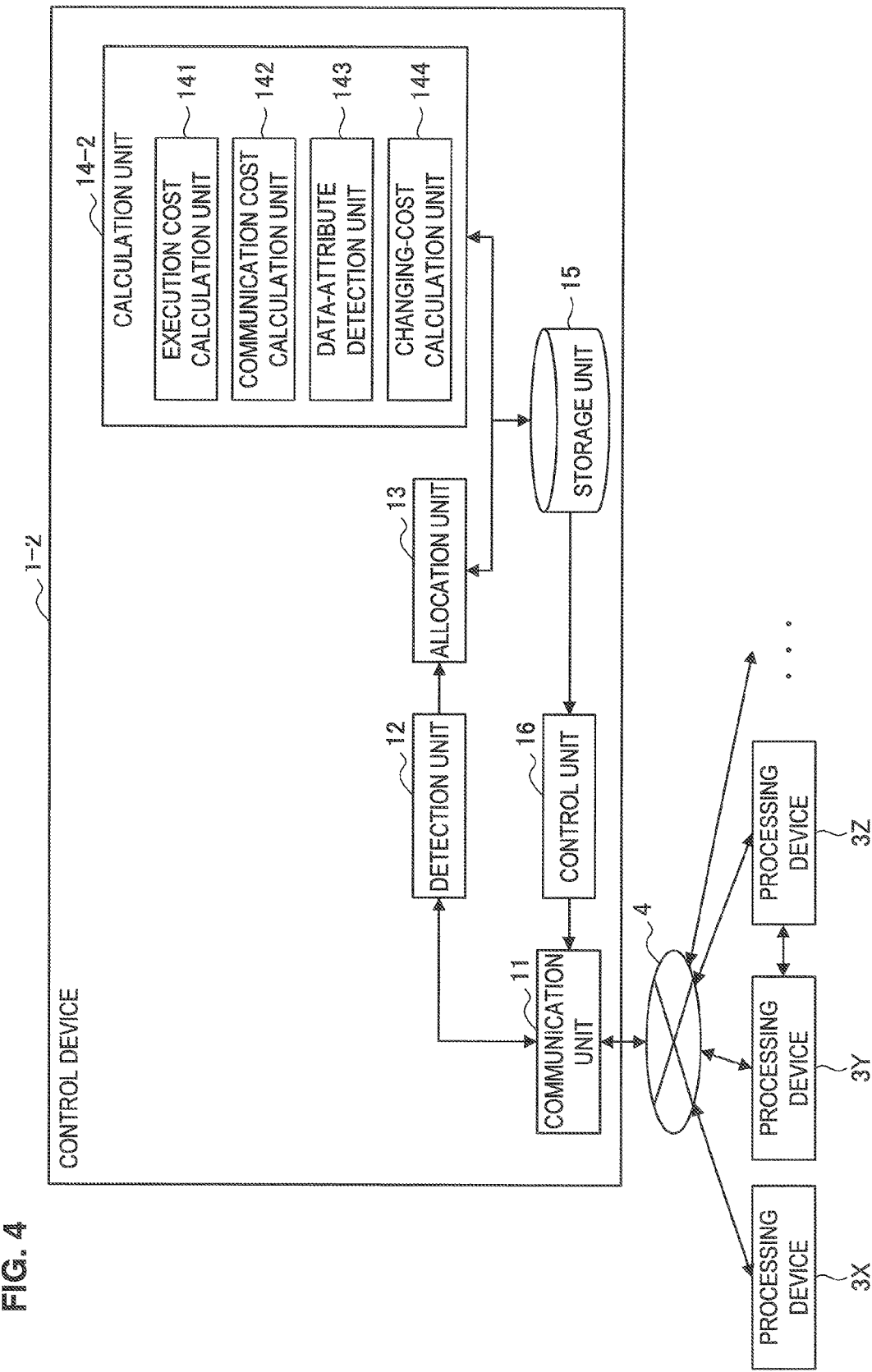
FIG. 4 is a block diagram showing a configuration of a control device according to a second embodiment.

FIG. 4 is a block diagram showing a configuration of a control device 1-2 according to the second embodiment. As shown in FIG. 4, the control device 1-2 has a communication unit 11, a detection unit 12, an allocation unit 13, a storage unit 15, and a control unit 16 in a way similar to the control device 1-1 explained above with reference to FIG. 2, and also has a calculation unit 14-2 in place of the calculation unit 14-1. In addition to the configuration of the calculation unit 14-1, the calculation unit 14-2 has a data-attribute detection unit 143 and a changing-cost calculation unit 144.

Data-Attribute Detection Unit 143

The data-attribute detection unit 143 has a function of detecting, on the basis of a content of the latter-stage task, an attribute of data for which transfer between tasks is necessary in an anteroposterior relationship. More specifically, the data-attribute detection unit 143 detects a minimum attribute value that the latter-stage task can accept for each attribute of data for which transfer between the tasks is necessary. The minimum attribute value means an attribute value to be compressed by converting the attribute into the attribute value, in a manner that a data amount to be transferred is minimized. Hereinafter, with reference to FIGS. 5 and 6, the minimum attribute value detected by the data-attribute detection unit 143 is explained in detail.

Figure 5:
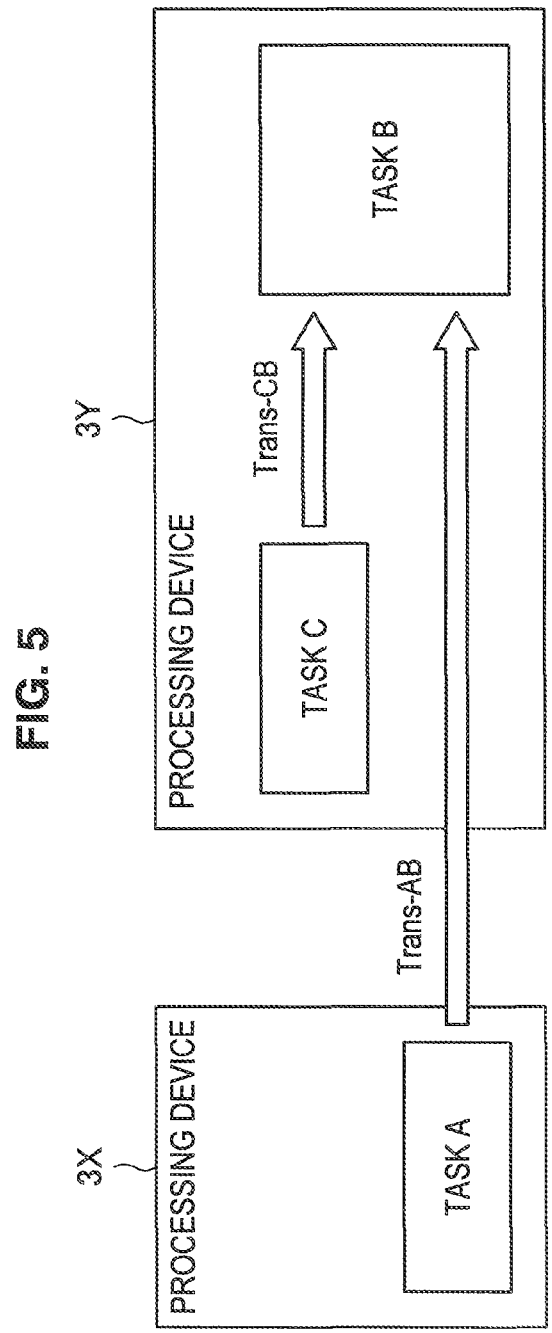
FIG. 5 is a diagram illustrating an example of processing performed by a data-attribute detection unit according to the second embodiment.
Figure 6:
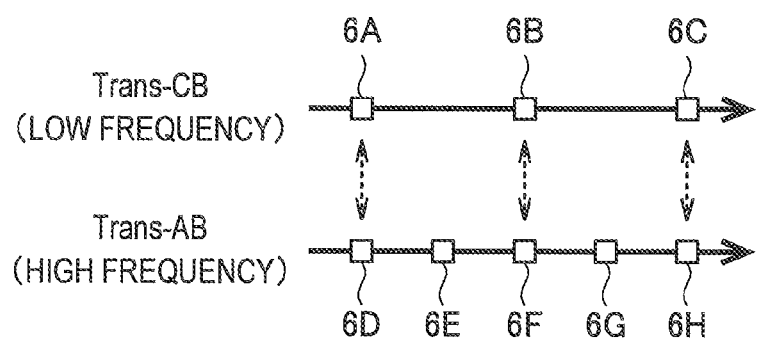
FIG. 6 is a diagram illustrating an example of processing performed by a data-attribute detection unit according to the second embodiment.

FIGS. 5 and 6 are diagrams illustrating examples of processing performed by the data-attribute detection unit 143 according to the second embodiment. In the example shown in FIG. 5, the processing device 3X executes a task A, and the processing device 3Y executes a task C. Subsequently, the processing device 3Y receives data transfer from the task A through communication (Trans-AB) with the processing device 3X and data transfer from the task C through process-to-process communication (Trans-CB) within the processing device 3Y and then executes the task B. At this time, as shown in FIG. 6, the processing device 3Y receives data transferred from the task A and data transferred from the task C while synchronizing the two data, and executes the task B.

FIG. 6 shows a flow of frames 6 forming data streams transferred from the task A and the task C. As shown in FIG. 6, task-to-task communication Trans-CB is a low frequency and task-to-task communication Trans-AB is a high frequency. In a case where executing the task B by using synchronized data only, the processing device 3Y executes the task B using frames 6A and 6D, frames 6B and 6F, and frames 6C and 6H. That is, frames 6E and 6G are not used and are wasted. Accordingly, even if the frequency of the task-to-task communication Trans-AB has been changed into a low frequency beforehand by the processing device 3X, it is not affect to a processing content of the task B. Accordingly, the data-attribute detection unit 143 detects that a minimum attribute value of a frequency relating to the task-to-task communication Trans-AB is a low frequency. Such difference between frequencies may happen in a case where one is sensor data and the other is a video having a high frame rate, for example. Besides the frequency, the data-attribute detection unit 143 can also detect that a minimum attribute value of precision (quality) of data transferred from the task A and the task B has low precision, for example. In a case where each attribute of the transfer data becomes a minimum attribute value, the communication cost is reduced because the data amount is reduced. The later-described allocation unit 13 can allocates the minimum attribute value to each attribute of the transfer data. Accordingly, the data amount to be transferred between the tasks can be compressed and the communication cost can be reduced.

The following Table 13 shows examples of ways of detecting a minimum attribute value for each attribute of data. As shown in Table 13, the data-attribute detection unit 143 detects, as a minimum attribute value, a black-and-white image or coarsest resolution that is necessary for a latter-stage task, in a case of a still image, for example.

TABLE 13

| Category | Attribute | Way to decide minimum attribute value |
| --- | --- | --- |
| Still image | Resolution | Make coarsest resolution that is necessary for a latter-stage task |
| | Number of colors | Make a black-and-white image |
| Moving image | Resolution | Make coarsest resolution that is necessary for a latter-stage task |
| | Number of colors | Make a black-and-white image |
| | Existence or non-existence of a sound channel | Delete a sound channel if a sound is not necessary for a latter-stage task |
| | Frame rate | Make a lowest frame rate that is necessary for a latter-stage task |
| Sound | Sampling rate | Make a lowest sampling rate that is necessary for a latter-stage task |
| Acceleration | Numerical precision | Make lowest numerical precision that is necessary for a latter-stage task |
| | Dimension | Convert into vector length obtained from three values that can be obtained from a triaxial acceleration sensor, if what a latter-stage task wants to know is simply "whether or not equipment is working" |
| | Sampling rate | Make a lowest sampling rate that is necessary for a latter-stage task |
| Eye gaze | Numerical precision | Make lowest numerical precision that is necessary for a latter-stage task |
| | Data valid flag | Choose only an eye gaze with a data valid flag |
| | Sampling rate | Make a lowest sampling rate that is necessary for a latter-stage task |
| Gyroscope | Numerical precision | Make lowest numerical precision that is necessary for a latter-stage task |
| | Dimension | Convert into vector length obtained from three values that can be obtained from a triaxial gyro sensor, if what a latter-stage task wants to know is simply "whether or not equipment is rotating" |
| | Sampling rate | Make a lowest sampling rate that is necessary for a latter-stage task |
| Position information | Numerical precision | Make lowest numerical precision that is necessary for a latter-stage task |
| | Measurement precision | Disable and remove position information whose precision at a time of recording is a fixed level or lower |
| | Boundary | Leave only a boundary flag, if what a latter-stage task wants to know is only "whether position is in or out of a fixed boundary" |
| | Sampling rate | Make a lowest sampling rate that is necessary for a latter-stage task |
| Pressing force | Numerical precision | Make lowest numerical precision that is necessary for a latter-stage task |
| | Threshold | Leave only a threshold flag, if what a latter-stage task wants to know is simply "whether pressing force is over or under a fixed value" |
| | Sampling rate | Make a lowest sampling rate that is necessary for a latter-stage task |
| Temperature | Numerical precision | Make lowest numerical precision that is necessary for a latter-stage task |
| | Threshold | Leave only a threshold flag, if what a latter-stage task wants to know is simply "whether temperature is over or under a fixed value" |
| | Sampling rate | Make a lowest sampling rate that is necessary for a latter-stage task |
| Humidity | Numerical precision | Make lowest numerical precision that is necessary for a latter-stage task |
| | Threshold | Leave only a threshold flag, if what a latter-stage task wants to know is simply "whether humidity is over or under a fixed value" |
| | Sampling rate | Make a lowest sampling rate that is necessary for a latter-stage task |
| Illuminance | Numerical precision | Make lowest numerical precision that is necessary for a latter-stage task |
| | Level | Classify illuminance into "bright", "dim", "dark", or "darkest" levels on the basis of a threshold and make a notification of current level, if what a latter-stage task wants to know is only a rough "level of illuminance" |
| | Sampling rate | Make a lowest sampling rate that is necessary for a latter-stage task |

TABLE 13-continued

| Category | Attribute | Way to decide minimum attribute value |
|---|---|---|
| Heartbeat | Numerical precision | Make lowest numerical precision that is necessary for a latter-stage task |
| | Threshold | Leave only a threshold flag, if what a latter-stage task wants to know is simply "whether heartbeat is over or under a fixed value" |
| | Sampling rate | Make a lowest sampling rate that is necessary for a latter-stage task |
| Depth | Numerical precision | Make lowest numerical precision that is necessary for a latter-stage task |
| | Region | Leave only depth information on a region which is necessary for a latter-stage task |
| | Sampling rate | Make a lowest sampling rate that is necessary for a latter-stage task |
| Geomagnetic field | Numerical precision | Make lowest numerical precision that is necessary for a latter-stage task |
| | Cardinal direction | Classify a geomagnetic field into "East", "West", "South", or "North" on the basis of a threshold and make a notification of current direction, if what a latter-stage task wants to know is only a rough "direction" |
| | Sampling rate | Make a lowest sampling rate that is necessary for a latter-stage task |
| Atmospheric pressure | Numerical precision | Make lowest numerical precision that is necessary for a latter-stage task |
| | Threshold | Leave only a threshold flag, if what a latter-stage task wants to know is simply "whether atmospheric pressure is over or under a fixed value" |
| | Sampling rate | Make a lowest sampling rate that is necessary for a latter-stage task |

Changing-Cost Calculation Unit 144

The changing-cost calculation unit 144 has a function of calculating cost (changing cost) that is necessary for changing in a case of changing each attribute of data for which transfer between tasks is necessary into a minimum attribute value which has been founded by the data-attribute detection unit 143. For example, with regard to a moving image, the changing-cost calculation unit 144 calculates cost that is necessary for re-encoding from a high definition (HD) video to a standard definition (SD) video. The calculation unit 144 stores the calculated changing cost in the storage unit 15.

Communication Cost Calculation Unit 142

The communication cost calculation unit 142 calculates communication cost in a case of changing each attribute of data for which transfer between tasks is necessary into a minimum attribute value which the data-attribute detection unit 143 has found. The communication cost is also referred to as communication cost based on the changed attribute value, hereinafter. A way to calculate the communication cost based on the changed attribute value is similar to the explanation in the first embodiment. Accordingly, repeated explanation is omitted. The communication cost calculation unit 142 calculates communication cost from the sum of changing cost and communication cost based on a changed attribute value.

(Allocation Unit 13)

The allocation unit 13 allocates communication setting (attribute value of transfer data) between a latter-stage task (second task) and a former-stage task (first task) according to a content of the latter-stage task to each combination of the latter-stage task and the former-stage task, the combination being indicated by processing sequence of the tasks in the pipeline. Specifically, the allocation unit 13 decides allocation of an attribute value on the basis of the comparison result between communication cost in a case where each attribute value of data for which transfer between tasks is necessary has changed to a minimum attribute value that the data-attribute detection unit 143 has found, and communication cost in a case where each attribute value has not been changed. Subsequently, as described in the first embodiment, the allocation unit 13 allocates processing of respective tasks to the processing devices 3 on the basis of the evaluation value that is the sum of the execution cost and the communication cost based on the decided allocation. Note that, the allocation unit 13 may regularly update allocation at regular time intervals, or may update the allocation each time when processing of a certain number of tasks ends.

The configuration of the control device 1-2 according to the present embodiment has been explained. Next, operation of the control device 1-2 is explained.

2-2-2. Operation Processing

The control device 1-2 according to the second embodiment operates in a way similar to the control device 1-1 according to the first embodiment shown in FIG. 3. However, in Step S110 shown in FIG. 3, the control device 1-2 according to the present embodiment calculates communication cost by performing operation shown in FIG. 7. Hereinafter, with reference to FIG. 7, operation in Step S110 is explained in detail.

Figure 7:
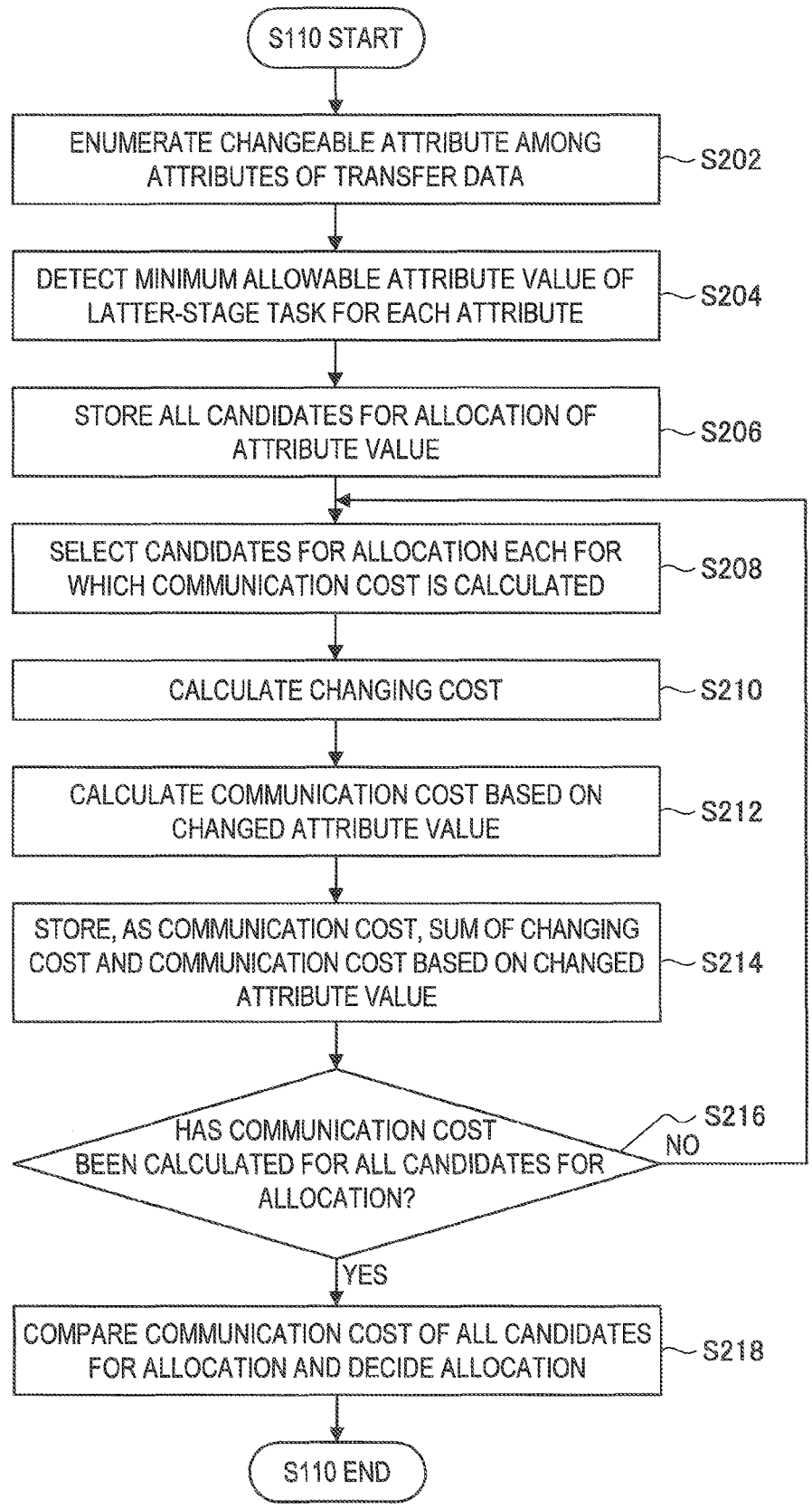
FIG. 7 is a flowchart showing operation of the control device according to the second embodiment.

FIG. 7 is a flowchart showing operation of the control device 2-2 according to the second embodiment. As shown in FIG. 7, in Step S202, the control device 1-2 first enumerates a changeable attribute among attributes of transfer data. Specifically, the data-attribute detection unit 143 detects, on the basis of a content of the latter-stage task, an attribute whose attribute value is changeable among attributes of data which is transferred from the former-stage task to the latter-stage task. For example, in the examples shown in FIGS. 5 and 6, the data-attribute detection unit 143 has detects two attributes including a frequency and data precision.

Next, in Step S204, the control device 1-2 detects a minimum allowable attribute value of the latter-stage task for each attribute. More specifically, the data-attribute detection unit 143 detects a minimum attribute value that the latter-stage task can accept for each attribute of data for which transfer between the tasks is necessary. For example, in the examples shown in FIGS. 5 and 6, the data-attribute detection unit 143 detects an attribute value as shown in the following Table 14. As shown in Table 14, the data-attribute detection unit 143 detects that current transfer data has high frequency (Hi) and high precision (Hi), and that a minimum attribute value has a low frequency (Low) and a low precision (Low).

TABLE 14

| Attribute | Current attribute value | Minimum attribute value |
|---|---|---|
| Frequency | Hi | Low |
| Precision of data | Hi | Low |

Next, in Step S206, the control device 1-2 stores all candidates for allocation of the attribute value. Specifically, the allocation unit 13 finds combinations (candidates for allocation) in a case where each attribute of data for which transfer between the tasks is necessary is changed and in a case where each of the attribute value is not changed, and then stores information indicating the combinations in the storage unit 15. For example, in the example shown in FIGS. 5 and 6, the allocation unit 13 stores, in the storage unit 15, four candidates for allocation shown in the following Table 15.

TABLE 15

| Attribute | Frequency | Precision of data |
|---|---|---|
| Allocation | Hi | Hi |
| Allocation | Low | Hi |
| Allocation | Hi | Low |
| Allocation | Low | Low |

Next, in Step S208, the control device 1-2 selects candidates for allocation each for which a communication cost is calculated. Specifically, the calculation unit 14-2 selects candidates for allocation to be targets for communication-cost calculation, from among the candidates for allocation found by the allocation unit 13. After that, in Steps S210 to S214, the calculation unit 14-2 calculates communication cost for each of the selected candidates for allocation.

Next, in Step S210, the control device 1-2 calculates changing cost. Specifically, the changing-cost calculation unit 144 calculates cost in a case where the current attribute remains without any change, and cost in a case where the current attribute value is changed into the minimum attribute value detected by the data-attribute detection unit 143. For example, in the examples shown in FIGS. 5 and 6, the changing-cost calculation unit 144 detects an attribute value as shown in the following Table 16.

TABLE 16

| | Cost whose attribute is not changed | Cost whose attribute is changed |
|---|---|---|
| Frequency | 0 | 2 |
| Precision of data | 0 | 10 |

Next, in Step S212, the control device 1-2 calculates communication cost based on the changed attribute value. The processing here is similar to the processing (Step S110 in FIG. 3) performed by the control device 1-1 according to the first embodiment. Accordingly, repeated explanation is omitted.

Next, in Step S214, the control device 1-2 stores, as the communication cost, the sum of the changing cost and the communication cost based on the changed attribute value. More specifically, the calculation unit 14-2 stores, as the communication cost of the candidates for allocation selected in Step S208, the sum of the changing cost calculated by the changing-cost calculation unit 144 and the communication cost calculated by the communication cost calculation unit 142 on the basis of the changed attribute value.

Next, in Step S216, the control device 1-2 determines whether or not the communication cost has been calculated for all candidates for allocation. For example, in the examples shown in FIGS. 5 and 6, the calculation unit 14-2 determines whether or not the communication cost has been calculated for all four candidates for allocation shown in Table 15 and has been stored in the storage unit 15.

In a case where communication cost has not been calculated for all candidates for allocation (NO in Step S216), the processing returns to Step S208.

On the other hand, in a case where the communication cost has been calculated for all candidates for allocation (YES in S216), the control device 1-2 compares the communication cost of all candidates for allocation and decides the allocation in Step S218. More specifically, the allocation unit 13 selects a candidate for allocation having a lowest communication cost from among all candidates for allocation. For example, in the examples shown in FIGS. 5 and 6, the storage unit 15 stores communication cost which has been calculated by the calculation unit 14-2 for respective candidates for allocation, as shown in the following Table 17. From among the candidates, the allocation unit 13 selects the allocation which is the candidate for allocation having the lowest communication cost.

TABLE 17

| | Communication cost | Changing cost of frequency | Changing cost of precision of data | Communication cost based on changed attribute value |
|---|---|---|---|---|
| Allocation | 10 | 0 | 0 | 10 |
| Allocation | 9 | 2 | 0 | 7 |
| Allocation | 15 | 0 | 10 | 5 |
| Allocation | 16 | 2 | 10 | 4 |

Note that, the example of allocating the attribute value using Trans-AB as a target has been explained in the above. However, it is also possible for the control device 1-2 to allocate an attribute value using Trans-CB as the target.

The operation of the control device 2-2 according to the second embodiment has been explained.

2-3. Third Embodiment 2-3-1. Overview

According to the present embodiment, allocation is updated while the processing devices 3 process allocated tasks. More specifically, the allocation unit 13 updates allocation with acquiring property information on the processing devices 3 through the communication unit 11 as necessary, while the processing devices 3 process tasks. A cost coefficient at a time of calculating the execution cost and a cost coefficient at a time of calculating the communication cost may change depending on various factors that changes every moment. As an example, the following Table 18 shows elements to be factors in changing cost coefficients.

TABLE 18

Factor in changing cost coefficient

Usable equipment group
(Example: get back to home and be able to use a home server)
Remaining battery
Load of CPU, GPU, or the like
Remaining memory
Current temperature of heat from equipment
Speed in wired or wireless communication The calculation unit 14 (calculation unit 14-1 or calculation unit 14-2) calculates an evaluation value on the basis of a cost coefficient which changes every moment depending on such factor. The allocation unit 13 updates allocation on the basis of the calculated evaluation value. The control unit 16 causes the processing devices 3 to process the tasks on the basis of the updated allocation. In this way, the control device 1 can enhance performance in the whole series of data processing in accordance with states of the processing devices 3 which change every moment.

For example, it is assumed that although the control device 1 performs allocation at first in a manner that a server on a cloud processes a part of processing, a radio wave condition becomes poor during the execution and communication cost with the server on the cloud becomes huge. In such case, the control device 1 performs reallocation of the processing in a manner that the processing allocated to the server on the cloud is performed by equipment in hand. In this way, the control device 1 can avoid increase in the communication cost caused by the poor radio wave condition, and can enhance performance in the whole series of data processing.

Note that, when updating the allocation, the control device 1 according to the present embodiment can adopt any one of the allocation way according to the first embodiment or the allocation way according to the second embodiment. A configuration of the control device 1 according to the present embodiment is similar to the control device 1-1 according to the first embodiment which has been explained with reference to FIG. 2, or the control device 1-2 according to the second embodiment which has been explained with reference to FIG. 4. Accordingly, repeated explanation is omitted. Hereinafter, with reference to FIG. 8, operation of the control device 1 according to the present embodiment is explained.

2-3-2. Operation Processing

Figure 8:
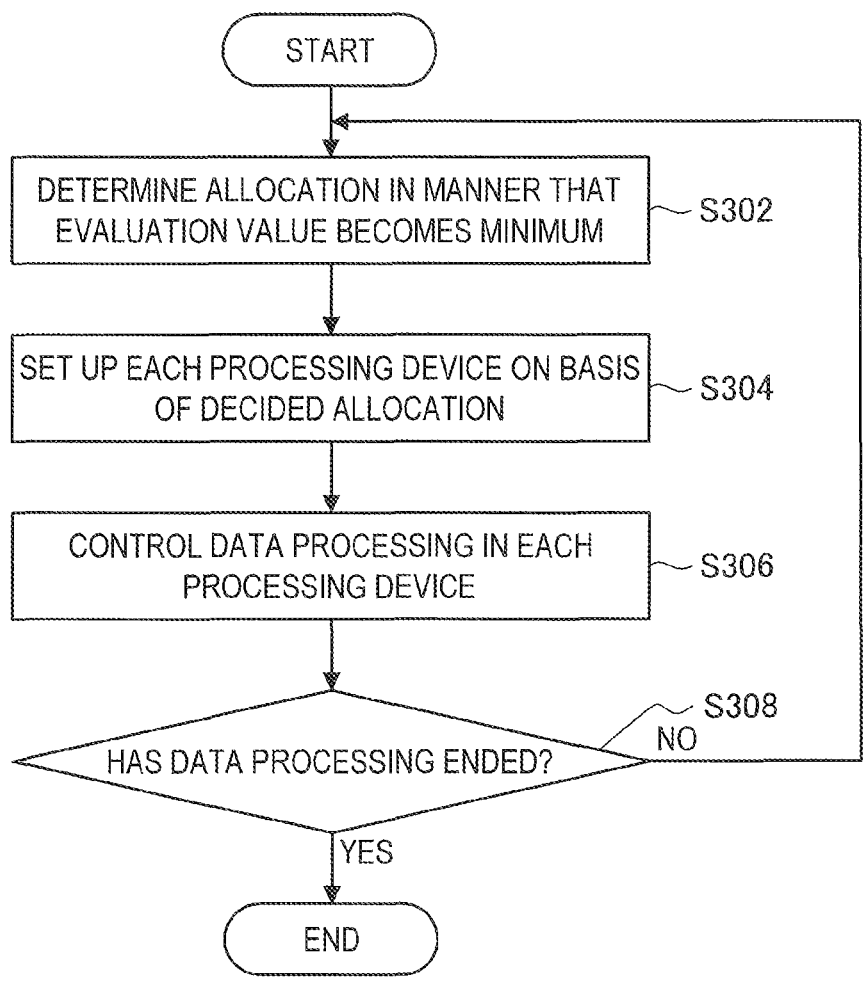
FIG. 8 is a flowchart showing operation of the control device according to a third embodiment.

FIG. 8 is a flowchart showing operation of the control device 1 according to the third embodiment. As shown in FIG. 8, in Step S302, the control device 1 first determines allocation in a manner that an evaluation value becomes minimum.

Next, in Step S304, the control device 1 sets up each of the processing devices 3 on the basis of the decided allocation. Specifically, the control unit 16 prepares for task processing on the basis of the allocation decided in Step S302. An example of the preparation may include establishment of communication with the processing devices 3 which process the tasks, and securement of memory of the processing devices 3.

Next, in Step S306, the control device 1 controls data processing in each of the processing devices 3. Specifically, the control unit 16 causes the processing devices 3 to process the tasks on the basis of the allocation decided in Step S302.

Next, in Step S308, the control device 1 determines whether or not the data processing has ended. Specifically, the control unit 16 determines whether or not the data processing has ended on the basis of whether or not any of the processing devices 3 is currently processing the tasks or whether or not communication between the tasks is currently performed.

In a case where the data processing has not ended (NO in Step S308), the processing returns to Step S302. In this way, the control device 1 can continue updating the allocation until the data processing ends, and can enhance performance in the whole series of data processing.

On the other hand, in a case where the data processing has ended (YES in S308), the control device 1 ends the processing of updating the allocation.

The operation of the control device 1 according to the third embodiment has been explained.

3. CONCLUSION

As described above, according to the embodiments of the present disclosure, it is possible for the processing device 1 to allocate a task to enhance processing efficiency in the heterogeneous environment. Specifically, in accordance with contents of tasks, the control device 1 can achieve faster and power saving processing in the whole system, by using effectively using equipment having high processing ability with regard to each task, and by reducing communication traffic depending on a communication environment between tasks. In addition, according to the embodiments of the present disclosure, a series of data processing can be written as tasks forming a pipeline. In this way, data processing capable of flexibly responding to change in equipment configurations can be achieved.

It should be understood by those skilled in the art that various modifications, combinations, sub-combinations and alterations may occur depending on design requirements and other factors insofar as they are within the scope of the appended claims or the equivalents thereof.

For example, according to the embodiments described above, allocation in a heterogeneous environment in which properties greatly differ from device to device has been explained. However, in similar way, the present technology is not limited to such example. For example, the technology according to the present disclosure is applicable to a case of allocating tasks to respective arithmetic devices in an environment in which properties of arithmetic devices such as CPU and GPU, which are included in a single device, differ greatly.

In addition, it is also possible to create a computer program for causing hardware such as CPU, ROM, and RAM, which are embedded in an information processing device, to execute functions similar to the configurations of the control device 1 and the processing devices 3. Moreover, it may be possible to provide a recording medium having the computer program stored therein.

Note that the present disclosure is not limited to the effect stated above and in addition to or in place of the effect stated above, may achieve any of the effects indicated in this specification or effects that can be understood from the specification.

Additionally, the present technology may also be configured as below.

(1) A control device including:

an allocation unit configured to allocate processing of tasks to any of respective processing devices on the basis of contents of the tasks and at least any of attributes and states of the processing devices.

(2) The control device according to (1), further including:

a communication unit; and a detection unit configured to detect the processing devices from communication with an outside performed by the communication unit, wherein the allocation unit allocates processing of the tasks to any of the respective processing devices detected by the detection unit.

(3) The control device according to (1) or (2), further including:

a calculation unit configured to calculate, on the basis of combinations of the tasks and the processing devices which process the tasks, evaluation values for respective candidates for allocation performed by the allocation unit, wherein the allocation unit selects any of the candidates for allocation on the basis of the evaluation values calculated by the calculation unit.

(4) The control device according to (3), wherein the calculation unit calculates the evaluation values on the basis of the sum of a product of a first standard cost based on the contents of the tasks and a first cost coefficient based on at least any of attributes or states of the processing devices which process the tasks.

(5) The control device according to (3) or (4), wherein the tasks form a pipeline, and wherein the calculation unit calculates the evaluation values further on the basis of processing sequence of the tasks indicated in the pipeline and a communication environment between the tasks.

(6) The control device according to (5), wherein the calculation unit calculates the evaluation values on the basis of the sum of a product of a second standard cost based on communication traffic between the tasks and a second cost coefficient based on the communication environment between the tasks.

(7) The control device according to (5) or (6), wherein the allocation unit allocates a communication setting between a first task and a second task on the basis of a content of the second task which is after the first task in the processing sequence indicated by the pipeline.

(8) The control device according to any one of (1) to (7), wherein the allocation unit updates the allocation while the processing devices process the tasks.

(9) The control device according to any one of (1) to (8), further including:

a control unit configured to perform control in a manner that the processing devices process the tasks on the basis of the allocation performed by the allocation unit.

(10) A processing device including:

a communication unit configured to transmit, to a control device, information indicating at least any of an attribute or a state of the processing device, and configured to receive a task allocated by the control device; and a processing unit configured to process the task received by the communication unit.

(11) An information processing method executed by a processor of an information processing device, the method including:

allocating processing of tasks to any of respective processing devices on the basis of contents of the tasks and at least any of attributes and states of the processing devices.

(12) A program for causing a computer to function as a control device including:

an allocation unit configured to allocate processing of tasks to any of respective processing devices on the basis of contents of the tasks and at least any of attributes and states of the processing devices.

What is claimed is:

1. A control device, comprising:

a central processing unit (CPU) configured to:

allocate a plurality of tasks to one of a plurality of processing devices based on a communication cost, wherein the plurality of processing devices are configured to process the plurality of tasks, wherein the communication cost is based on contents of the plurality of tasks and at least one of attributes or states of the plurality of processing devices, wherein the plurality of tasks comprises a first task and a second task, wherein the communication cost of the first task and the second task is a product of a defined standard cost that corresponds to the first task and the second task, and a cost coefficient that corresponds to the first task and the second task processed by one or more of the plurality of processing devices; and calculate evaluation values for respective candidates for the allocation based on a sum of a product of a second standard cost based on communication traffic between the plurality of tasks and a second cost coefficient based on a communication environment between the plurality of tasks, wherein the plurality of tasks are processed by the one of the plurality of processing devices.

2. The control device according to claim 1, wherein the CPU is further configured to:

detect the plurality of processing devices; and allocate the plurality of tasks to the one of the plurality of processing devices detected by the CPU.

3. The control device according to claim 1, wherein the CPU is further configured to:

calculate, based on combinations of the plurality of tasks and the plurality of processing devices which process the plurality of tasks, the evaluation values for the respective candidates for the allocation; and select one of the candidates for allocation based on the calculated evaluation values.

4. The control device according to claim 3, wherein the CPU is further configured to calculate the evaluation values based on a sum of a product of a first standard cost based on the contents of the plurality of tasks and a first cost coefficient based on the at least one of the attributes or the states of the plurality of processing devices.

5. The control device according to claim 3, wherein the plurality of tasks form a pipeline, and wherein the CPU is further configured to calculate the evaluation values further based on a processing sequence of the plurality of tasks indicated in the pipeline and the communication environment between the plurality of tasks.

6. The control device according to claim 5, wherein the CPU is further configured to allocate a communication setting between the first task and the second task based on a content of the second task which is after the first task in the processing sequence indicated by the pipeline.

7. The control device according to claim 1, wherein the CPU is further configured to update the allocation while the plurality of processing devices process the plurality of tasks.

8. The control device according to claim 1, wherein the CPU is further configured to control the plurality of processing devices such that the plurality of processing devices process the plurality of tasks based on the allocation.

9. A processing device, comprising:
a Central Processing Unit (CPU) configured to:
transmit, to a control device, information that indicates at least one of an attribute or a state of the processing device;
receive a task allocated, by the control device, out of a plurality of tasks based on a communication cost, wherein the communication cost is based on contents of the plurality of tasks and the at least one of the attribute or the state of the processing device,
wherein the plurality of tasks comprises a first task and a second task,
wherein a plurality of processing devices comprises the processing device,
wherein the communication cost of the first task and the second task is a product of a defined standard cost that corresponds to the first task and the second task, and a cost coefficient that corresponds to the first task and the second task processed by one or more of the plurality of processing devices,
wherein the task is allocated by the control device by calculation of evaluation values for respective candidates for the allocation based on a sum of a product of a second standard cost based on communication traffic between the plurality of tasks and a second cost coefficient based on a communication environment between the plurality of tasks; and
process the received task.

10. An information processing method, comprising:
in an information processing device:
allocating, by a processor, processing of a plurality of tasks to one of a plurality of processing devices based on a communication cost, wherein the communication cost is based on contents of the plurality of tasks and at least one of attributes or states of the plurality of processing devices,
wherein the plurality of tasks comprises a first task and a second task,
wherein the communication cost of the first task and the second task is a product of a defined standard cost, that corresponds to the first task and the second task, and a cost coefficient that corresponds to the first task and the second task processed by one or more of the plurality of processing devices;
calculating evaluation values for respective candidates for the allocation based on a sum of a product of a second standard cost based on communication traffic between the plurality of tasks and a second cost coefficient based on a communication environment between the plurality of tasks; and
processing the plurality of tasks by the one of the plurality of processing devices.

* * * * *